Aug. 6, 1968  S. A. O. WIRFELT  3,395,434
CUTTING INSERT FOR CHIP CUTTING MACHINING
Filed May 24, 1967  8 Sheets-Sheet 1

Aug. 6, 1968     S. A. O. WIRFELT     3,395,434

CUTTING INSERT FOR CHIP CUTTING MACHINING

Filed May 24, 1967     8 Sheets-Sheet 6

United States Patent Office 3,395,434
Patented Aug. 6, 1968

3,395,434
CUTTING INSERT FOR CHIP
CUTTING MACHINING
Sven Axel Olof Wirfelt, Sandviken, Sweden, assignor to
Sandvikens Jernverks AB, Sandviken, Sweden, a corporation of Sweden
Filed May 24, 1967, Ser. No. 640,959
Claims priority, application Sweden, June 1, 1966,
7,443/66; Apr. 3, 1967, 4,561/67
6 Claims. (Cl. 29—95)

ABSTRACT OF THE DISCLOSURE

A regularly polygonal cutting insert for chip cutting machining is form-sintered from metal carbide material. It is characterized by the fact that at a corner of the insert (adjacent which corner there is a cutting edge) there is located a main chip breaker in the form of a chip-breaking depression alongside of the cutting edge, and, at said corner, a further depression in the surface of the main chip breaker constituting a secondary chip breaker. In overall effect, the insert has a three-stage (or, triple) chip breaker.

---

The invention relates to an insert for chip cutting machining of metallic work-pieces. When machining with a cutting tool it is important, with regard to the risk for personal injuries and to the function of the machine that the chip is broken into short portions which easily can fall into the chip collecting container of the machine. If the chips are not broken but instead obtain the shape of long threads, these get wound around the work-piece and follow the rotation thereof and get stuck in the machine, which creates a great risk of personal injuries and disturbance of the operation. The latter is especially inconvenient in automatic machines where the operation is not continuously watched by a machinist.

Earlier, when such tools were used which the user himself had to grind, a chip breaker was ground to a shape and size adapted with regard to the material, the depth of the cut and the feed. Nevertheless there were difficulties in finding a shape of the chip breaker which would break the chip at small cutting depths and feeds, when the chip due to its small cross section had to be very sharply bent in order to break.

Currently there are usually used factory-made cutting inserts which are mechanically clamped in the cutting tool. The chip breaking can be achieved by two different types of chip breakers, either a separate chip breaking plate resting on top of the insert or a chip breaking recess formed in the insert. The present invention relates to an insert of the latter type. According to the invention the insert has, besides the usual main chip breaker along the cutting edge, a special secondary chip breaker in the cutting corner, which secondary chip breaker has a smaller width than has the main chip breaker and, thus, breaks the chips having a smaller cross section which are formed at smaller cutting depths.

Closer details of the invention appear from the following specification with drawing figures, showing.

Figure 1:
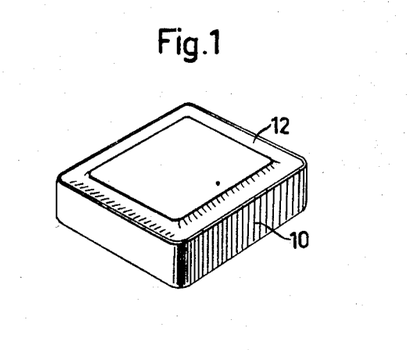
FIGS. 1 and 2, a perspective view of conventional inserts.
Figure 2:
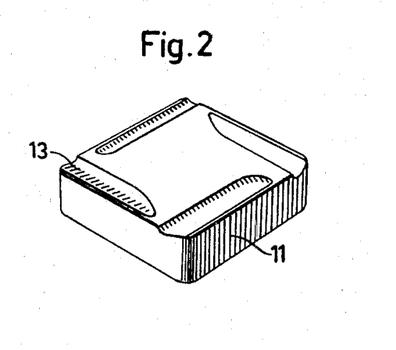
Figure 3:
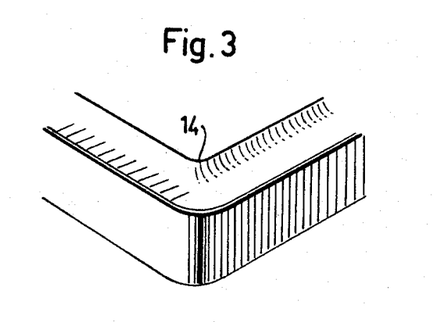
FIGS. 3 and 4, cutting corners of different shape on the insert shown in FIG. 1.
Figure 4:
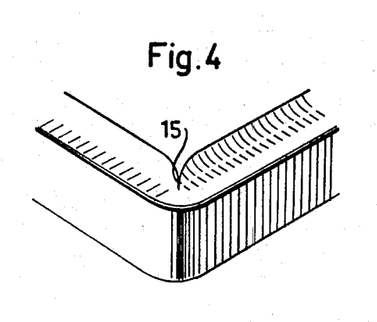
Figure 5:
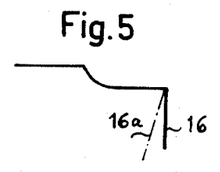
FIGS. 5–9, examples of profiles of chip breakers for which the invention can be adapted.
Figure 6:
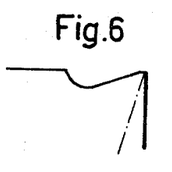
Figure 7:
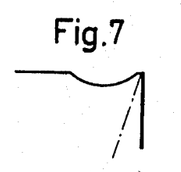
Figure 8:
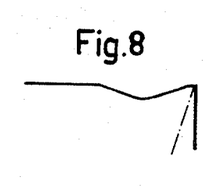
Figure 9:
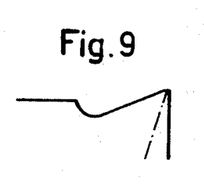

FIGS. 1 and 2 show conventional inserts, 10 and 11, in which the chip breakers 12 and 13 extend along the sides of the insert which form the cutting edges. They may extend also around the corner roundings, the cutting edge and the chip breaker being continuous all along the sides of the insert. The insert is symmetrical and can be used in both left-hand and right-hand tool holders, as shown in FIG. 1. FIGS. 3 and 4 show variations of this insert. In FIG. 3 the chip breakers meet at a rounded portion 14, while in FIG. 4 the rear flanks of the chip breakers meet at an intersection line 15. In both these cases the chip breaker has a width in the corner which is substantially the same as that along the cutting edges, which means that the chip will not be broken at small cutting depths, requiring a sharper bending of the chip.

The chip breaker groove can also continue straight towards the corner as indicated by the groove 13 in FIG. 2, which goes across the cutting edge that lies behind the corner, reducing the length of this cutting edge. The insert is not symmetrical, and tool holders for left hand and right hand use require different inserts, which are allochirally symmetrical.

FIGS. 5–9 show different embodiments of chip breakers on the inserts shown in FIGS. 1–4. The edge surfaces 16 of the insert may be at 90° angle with the parallel top and bottom sides of the insert, which then is supposed to be used in a negative tool holder. If an insert of this type is formed with chip breakers on both sides it can be turned over and be used on both sides, which means that it contains twice as many cutting edges as an insert which is not turnable. On the insert, shown in FIG. 1 there are 4 cuting edges and cutting corners on one side, representing 4 indexing positions of the insert. If the underside is correspondingly shaped there will be 8 cutting edges and corners. Often, however, the insert is made with one side plane in order to have a more even and larger contact surface with the bottom of the insert site.

The edge surfaces of the insert may alternatively (16a) be placed at an angle less than 90° with the top side, the insert being intended for use in a positive tool holder. The insert is then not turnable and has a plane bottom surface.

As a chip breaker breaks the chip only within a certain limited range of cutting depth and feed, defined by the shape and size of the chip breaker, the use of factory-made inserts makes it necessary to have accessible a series of inserts with different chip breakers for different cutting depths and feeds. FIGS. 5–9 are examples of a variation of chip breakers which together cover a larger range of cutting depths and feeds. The variation is obtained by change in the shape and in the size of the chip breaker.

In this connection it is a special problem to effect chip breaking in finish cutting when both the cutting depth and the feed are small. A conventional chip breaker can in the way above described be chosen with regard to suitable shape and size for the desired type of rough cutting, but when the workpiece is to be finished the insert must be substituted by another insert having a chip breaker adapted for finishing machining: this is not desirable as it takes time and may lessen the accuracy of the machining.

The invention relates to an insert having a main or primary chip breaker for rough cutting and a secondary chip breaker in the cutting corner which is adapted for finish cutting. This makes it possible to use the same insert and the same set-up thereof first for roughing and then for finishing a work-piece, obtaining a satisfactory chip breaking in both operations. The invention is in the first place useful for inserts which are mechanically clamped and usually have several cutting corners on one or both sides.

Figure 10:
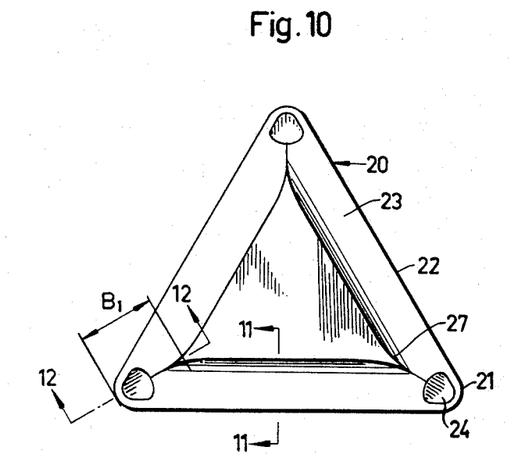
FIGS. 10–12, elevational view and two cross sections of an insert according to the invention.
Figure 11:
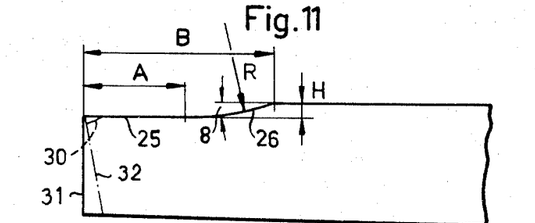
Figure 12:
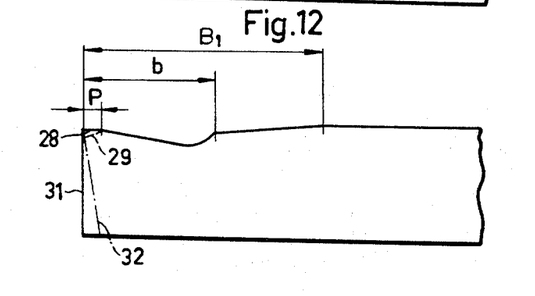

FIGS. 10–12 show an example of a triangular insert 20 according to the invention, FIGS. 11 and 12 being enlarged section from FIG. 10. The insert has three congruent cutting corners with cutting edges 22 and along the edges main or primary chip breakers 23. In each cutting corner there is a secondary chip breaker 24, constituted by a depression in the top surface of the insert adjacent the edge of the corner. The main chip breaker has a horizontal portion 25, forming a chip surface and a rear chip breaking land 26. The width A of the chip surface 25 should be 0.3–0.8 of the total width B of the chip breaker which usually is 2–10 mm. The chip breaking land 26 may be curved by a radius R, which is 0.5–4 of the width B. The height H of the chip breaker is suitably 0.05–0.3 of the width B. As can be seen from FIG. 10 the width of the main chip breaker may diminish adjacent the corners along the portion 27, the chip breaking of chips with a width between those for normal roughing and finishing being improved.

In finishing, the chip is so narrow and thin that it is not at all broken by the main chip breaker. Then the secondary chip breaker 24 starts acting. It has a width $b$ which, measured along the bisector of the corner, is less than the width $B_1$ of the main chip breaker, measured along the bisector, and also less than the width B of the main chip breaker, measured perpendicularly to the cutting edge. The width "$b$" should be less than 0.8 B, and may suitably lie within the range 0.3 B–0.7 B, usually 0.4 B–0.6 B, especially, approximately 0.5 B. It is to be noted that "$b$" is measured from the cutting corner edge to the rear edge of the depression 24.

The secondary chip breaker does not, in the illustrated case, extend quite to the edge of the cutting corner but is connected thereto by a plane bevel, which either can have the position 28 parallel with the top surface of the insert or have the position 29, inclined outwards–downwards. Also the edge of the main chip breaker may be bevelled as shown at 30. The edge line 31 shows a negative insert with the edge surface perpendicular to the bottom surface, and 32 shows a positive insert where the edge surface is inclined to the bottom surface.

Figures 13, 14:
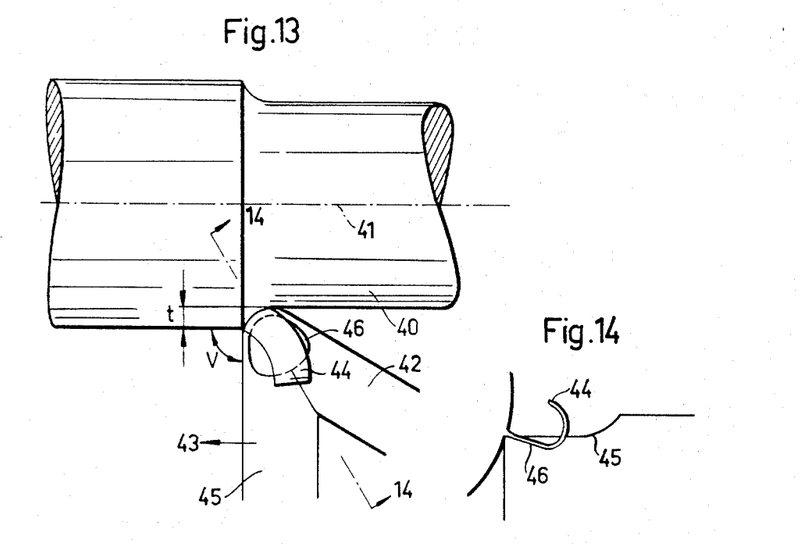
FIGS. 13–16, examples of machining with an insert according to the invention.

FIGS. 13–16 show working examples for finishing and roughing with the insert shown in FIGS. 10–12. FIGS. 13 and 14 show finishing in an elevational view and in a section. A work-piece 40 rotates on the axis 41 and is machined by the insert 42 to a cutting depth $t$ which is relatively insignificant, and the insert is fed in the direction 43. The side cutting edge angle $v$ is in the illustrated case 90° but it may vary. For square inserts $v$ must of course be smaller than 90° in order that the rear edge of the insert does not trail along the work-piece. The cutting corner detaches a chip 44 which is so narrow that it lies entirely outside the space of the primary chip breaker 45, and the chip is broken by the secondary chip breaker 46.

Figure 15:
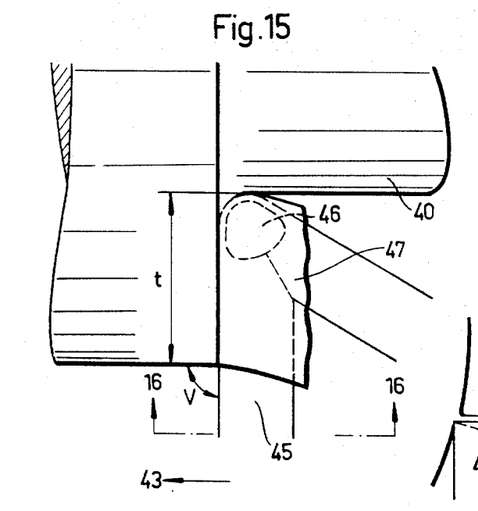
Figure 16:
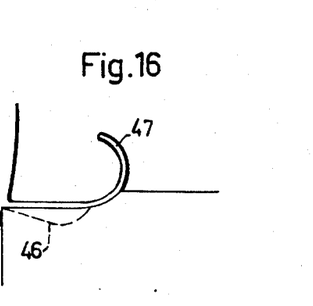

FIGS. 15 and 16 show roughing with the same insert, the cutting depth "$t$" being substantially greater than in FIG. 13. At this depth of the cut the primary chip breaker 45 takes over the chip breaking and the secondary chip breaker 46 ceases to act, the chip 47 sliding over it.

Figure 17:
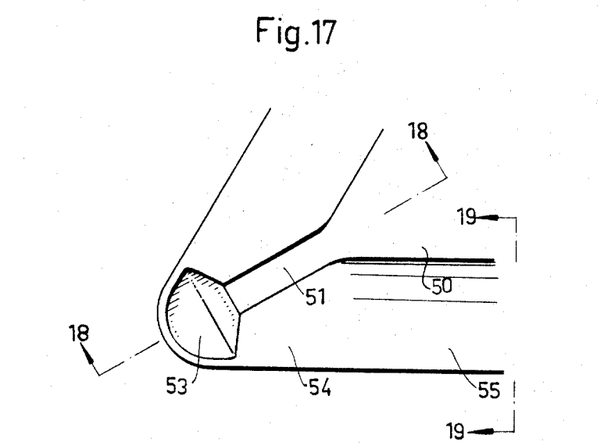
FIGS. 17–19, elevational view and sections of another embodiment of an insert according to the invention.
Figure 18:
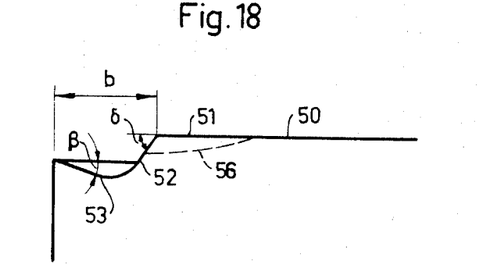
Figure 19:
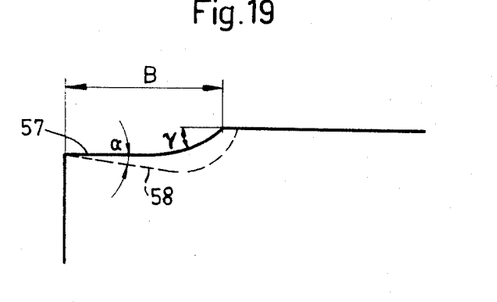

FIGS. 17–19 show a varied embodiment of the corners on the insert shown in FIG. 10. From the central raised portion 50 of the insert a ridge extends towards the cutting corner, which ridge terminates at the chip breaking land 52 on the secondary chip breaker 53. In this way the said land becomes broader are well as higher than in the case shown in FIG. 10, which circumstance contributes to a more efficient breaking of the chip at small cutting depths. The ridge also forms a transition portion 54 of the primary chip breaker 55, a close to the secondary chip breaker, said transition portion having a width that diminishes towards the corner. The ridge 51 may lie in the same plane as the portion 50 or may be somewhat lowered below as indicated by the dashed line at 56. This lowering may be advantageous for great cutting depths in order to avoid breaking a broad chip too sharply adjacent the cutting corner. The chip surface 57 on the primary chip breaker is shown parallel with the top surface of the insert but may alternatively be inclined downwards-inwards along the line 58, forming an angle $\alpha$ with the top surface. The angle $\alpha$ is usually smaller than 25° and lies preferably in the range 0–15°, often 0–6°. The angle $\beta$ between the chip surfaces of the secondary and the primary chip breakers should also be less than 25°. The inclination of the rear edge surface of the secondary chip breaker should be 20–75° and the inclination $\gamma$ of the rear surface of the primary chip breaker should also be 20–75°.

Figure 20:
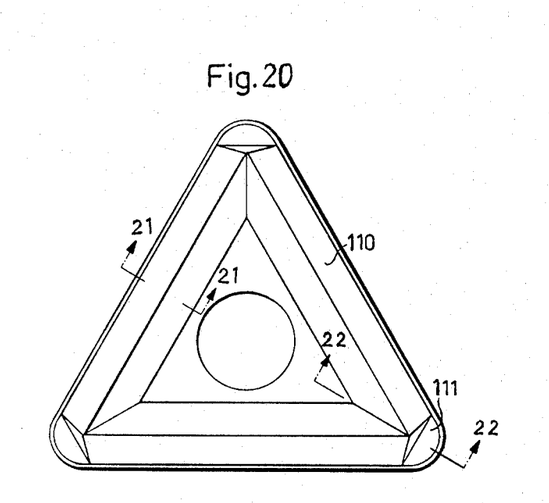
FIGS. 20–22, a third embodiment of a cutting insert according to the invention.
Figure 21:
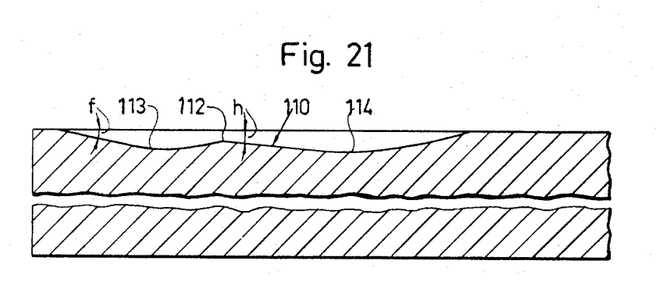
Figure 22:
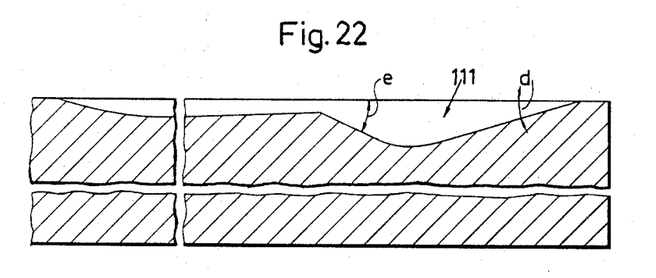

FIGS. 20–22 show an insert having similar corners as the one in FIG. 10. In this case the main chip breaker 110 is formed by two parallel grooves 113 and 114 instead of one groove as in FIG. 10, the grooves being separated by a ridge 112. FIG. 21 shows a section of the main chip breaker on the line 21—21. The angles between the horizontal plane and the outer flanks of the grooves may be for instance $f=12°\pm 3°$ and $h=5°\pm 2°$ respectively. FIG. 22 shows a section of the secondary chip breaker 111 on the bisector line 22—22 of the corner. The inclination angle of the fore flank may be $d=17°\pm 3°$, preferably $17°\pm 1°$, and the rear flank $e=25°\pm 3°$, preferably $25°\pm 1°$. The ridge 112 lies suitably somewhat below the top surface, and the inner groove 114 is suitably somewhat deeper than the outer groove 113.

The advantage of this embodiment is that the main chip breaker is adapted to break chips that are thinner than usual but too broad to be broken by the secondary chip breaker in the corner. Chips of normal thickness are broken by the rear chip breaking groove 14, and thinner chips are broken by the groove 13 adjacent the cutting edge. In this way the insert can break thin chips of various widths, the secondary corner chip breaker breaking such thin chips that have a very small width, and which are formed when finishing a work-piece. This embodiment thus forms a three-stage chip breaker, one stage for roughing with a thick chip, a second stage for roughing with a thin chip and a third stage for finishing.

FIGS. 23–26 show a modification of FIGS. 10–12, the juncture between the meeting chip breakers 61, 62 being rounded as in FIGS. 1 and 3. The chip surface 63 of the main chip breaker adjacent the cutting edge is moreover inclined downwardly-inwardly but may, as shown in FIGS. 10–12, be parallel with the top side of the insert. The inclination $\alpha$ of the chip surface should be within the range 0°–25°, preferably 0°–15°, and is often 9°–15°. The angle $\beta$ between the chip surface of the main chip breaker and of the secondary chip breaker should be greater than 3° and smaller than 25°, usually smaller than 15°.

Figure 23:
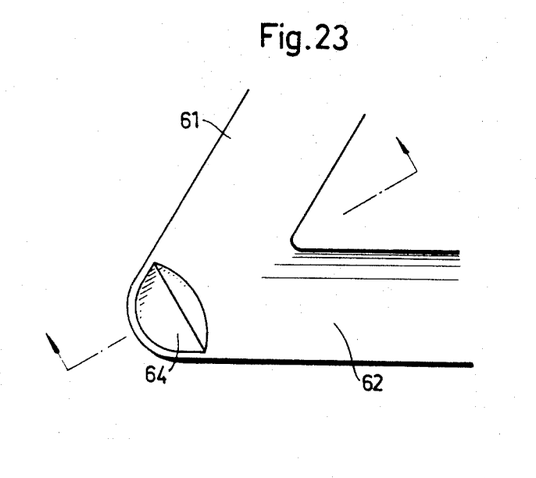
FIG. 23–26, a fourth embodiment of a cutting insert according to the invention.
Figure 24:
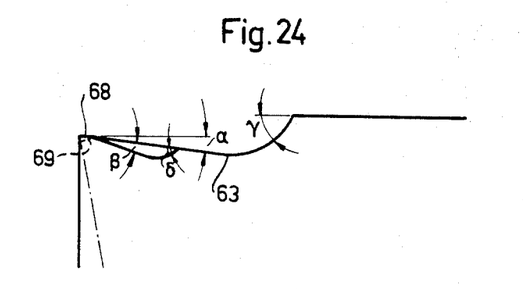
Figure 25:
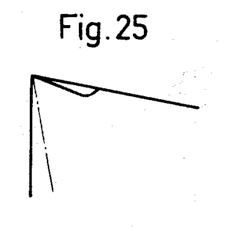
Figure 26:
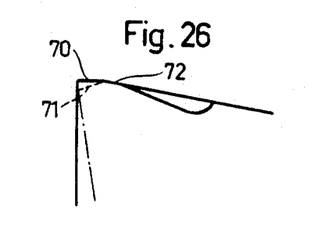

In FIGS. 23 and 24 there is shown a plane bevel 68 at the edge of the cutting corner. Said bevel is parallel with the top surface of the insert but may also be outwardly inclined as indicated by the line 69. FIG. 25 shows an embodiment without a plane bevel and FIG. 26 shows an embodiment with alternative plane bevels 70 and 71, the secondary chip breaker beginning at some distance from the inner edge, so that a broken bevel surface consisting of surface portions 70 and 71 and also the surface portion 72, is formed, the surface portion 72 lying in the same plane as the chip surface of the main or primary chip breaker.

Figure 27:
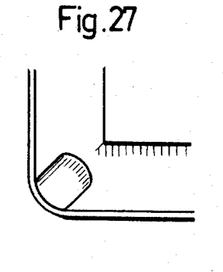
FIGS. 27–35, elevational views of different embodiments of a cutting corner according to the invention, and FIG. 36, a comparative diagram of chip breaking with a conventional insert and an insert according to the invention.

FIGS. 27–35 show various examples of cutting corners, cutting edges and chip breakers according to the invention. FIG. 27 shows a 90° cutting corner with a plane bevel along both cutting edges and the cutting corner.

Figure 28:
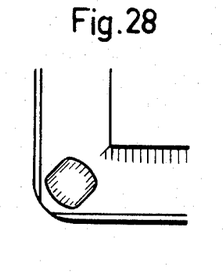
Figure 29:
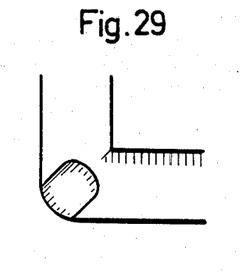
Figure 30:
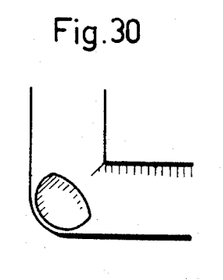
Figure 31:
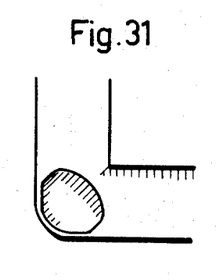
Figure 32:
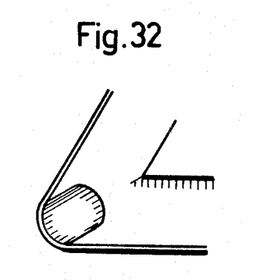
Figure 33:
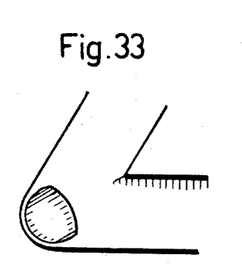
Figure 34:
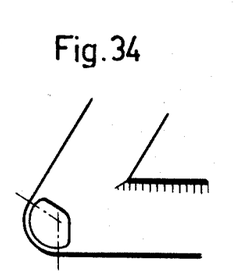
Figure 35:
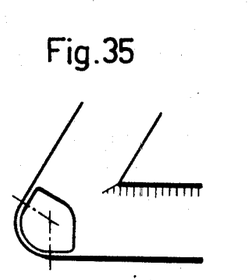

The secondary chip breaker borders immediately at the plane bevel. In FIG. 28 the secondary chip breaker lies somewhat spaced from the cutting corner. The plane bevels along the cutting edges do not go around the cutting corner. In FIG. 29 plane bevels are absent, and the secondary chip breaker extends to the edge of the corner. In FIGS. 30 and 31 the secondary chip breaker lies at some distance from the corner, the secondary chip breaker in FIG. 30 extending only along the curved portion of the corner, while in FIG. 31 the secondary chip breaker extends also a short distance along the straight cutting edges. FIG. 32 shows an acute angled cutting corner with a plane bevel along both the cutting edges and the cutting corner. FIGS. 33–35 show acute angled variations of the right angled cutting corners shown in FIGS. 30 and 31.

Figure 36:
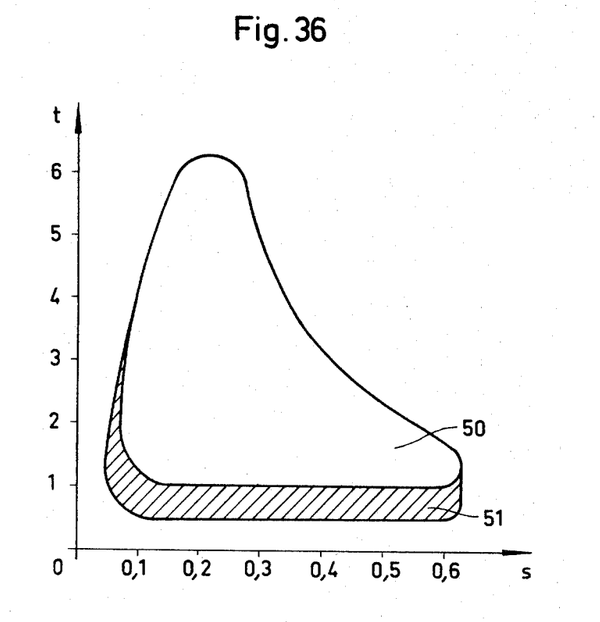

The diagram in FIG. 36 illustrates the chip breaking of a conventional insert and of an insert according to the invention, the cutting depth $t$ being marked along the vertical axis and the feed $s$ along the horizontal axis. The closed area 50 represents the range for which a satisfactory chip breaking is obtained with a conventional insert. The shaded area 51 represents the additional range for which a good chip breaking is obtained with an insert according to the invention. The diagram shows that according to the invention a range below the curve 50 is gained, which means that satisfactory chip breaking is achieved for smaller cutting depths than earlier for both great and small feeds.

A secondary chip breaker according to the invention can be used for symmetrical and unsymmetrical cutting corners. In the first mentioned case also the secondary chip breaker is suitably symmetrical, and in the latter case it may be unsymmetrical.

A cutting insert according to the invention should be made of a hard and wear-resistant material, usually a sintered carbide or a sintered ceramic material.

I claim:

1. Cutting insert for chip cutting machining of metallic work pieces, said insert having at least one cutting corner with at least one cutting edge adjoining said corner, a chip breaking depression being provided in said insert alongside the said cutting edge, forming a main chip breaker, the bottom of said main chip breaker having adjacent the said corner a further depression forming a secondary chip breaker which is confined to the region of said corner.

2. Cutting insert as defined in claim 1 in which said main chip breaker is formed of two parallel grooves.

3. Cutting insert as defined in claim 1 having substantially the shape of a regular polygon, the corners of which are formed as cutting corners, the side surfaces forming cutting edges, a main chip breaker being formed along each cutting edge as a depression in the top surface of the insert, each corner having a further depression in the surface of the main chip breaker, said further depression constituting said secondary chip breaker.

4. Cutting insert as defined in claim 3, having substantially a triangular shape.

5. Cutting insert as defined in claim 1, wherein said main chip breaker is constituted by two parallel contiguous grooves meeting in a ridge which lies somewhat below the level of the top surface of the insert, that groove which is relatively remote from said cutting edge being somewhat deeper than the groove which is adjacent said cutting edge and functioning to break relatively thick wide chips, said edge-adjacent groove functioning to break relatively thin wide chips and said secondary chip breaker depression functioning to break thin chips of relatively small width, said grooves and depression providing three stages of chip breaking.

6. Cutting insert as defined in claim 5 in which the fore edge of the groove adjacent the cutting edge has a depression angle of $12°\pm3°$, and the fore edge of the secondary chip breaker has a depression angle of $17°\pm3°$.

References Cited

UNITED STATES PATENTS

| | | | |
|---|---|---|---|
| 1,414,520 | 5/1922 | Martin | 29—95 |
| 3,137,917 | 6/1964 | Dowd | 29—95 |
| 3,187,406 | 6/1965 | Frank | 29—95 |
| 3,299,489 | 1/1967 | Pohle | 29—96 |

HARRISON L. HINSON, *Primary Examiner.*